(12) United States Patent
Shedel et al.

(10) Patent No.: US 9,740,517 B2
(45) Date of Patent: Aug. 22, 2017

(54) DYNAMIC VIRTUAL MACHINE MEMORY MANAGEMENT

(75) Inventors: Andrey Shedel, Sammamish, WA (US); Mohamed Bouchet, Redmond, WA (US); Eric Traut, Bellevue, WA (US); Osama M. Salem, Redmond, WA (US); Kevin Broas, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 12/345,469

(22) Filed: Dec. 29, 2008

(65) Prior Publication Data

US 2010/0169536 A1    Jul. 1, 2010

(51) Int. Cl.
   *G06F 9/455*    (2006.01)

(52) U.S. Cl.
   CPC ............... *G06F 9/45558* (2013.01); *G06F 2009/45583* (2013.01)

(58) Field of Classification Search
   CPC ............ G06F 9/45558; G06F 9/45533; G06F 9/5016; G06F 9/5077
   USPC .......... 711/6, 170, 173, E12.084; 718/1, 104
   See application file for complete search history.

(56) References Cited

U.S. PATENT DOCUMENTS

| 6,449,663 | B1* | 9/2002 | Carney et al. ............... 710/15 |
| 6,738,886 | B1* | 5/2004 | Mendoza et al. ............ 711/173 |
| 6,745,312 | B1* | 6/2004 | Schnee et al. ............... 711/173 |
| 7,240,177 | B2  | 7/2007 | Hepkin et al. |
| 7,412,492 | B1  | 8/2008 | Waldspurger |
| 7,433,951 | B1  | 10/2008 | Waldspurger |
| 7,698,529 | B2* | 4/2010 | Accapadi et al. ........... 711/173 |
| 2004/0143664 | A1* | 7/2004 | Usa et al. ................... 709/226 |
| 2005/0038989 | A1* | 2/2005 | Esfahany ..................... 713/100 |
| 2005/0132362 | A1* | 6/2005 | Knauerhase et al. .......... 718/1 |
| 2005/0235123 | A1* | 10/2005 | Zimmer et al. ............ 711/170 |
| 2005/0262505 | A1 | 11/2005 | Esfahany et al. |
| 2006/0161719 | A1 | 7/2006 | Bennett et al. |
| 2006/0184938 | A1 | 8/2006 | Mangold |
| 2006/0242641 | A1* | 10/2006 | Kinsey et al. ................. 718/1 |
| 2007/0136506 | A1 | 6/2007 | Traut et al. |

OTHER PUBLICATIONS

Waldspurger, C., "Memory Resource Management in VMware ESX Server" http://MVIR-0370__/325655.01www.usenix.org/events/osdi02/tech/full_papers/waldspurger/waldspurger.pdf, 2002, 15 pages.

"VMware Workstation 4.5," Vmware, Inc., http://MVIR-0370__/325655.01www.vmware.com/support/ws45/doc/performance_mem_ws.html, 2008, 4 pages.

(Continued)

*Primary Examiner* — Michael Alsip
(74) *Attorney, Agent, or Firm* — Baker & Hostetler LLP

(57) ABSTRACT

Techniques for adjusting memory in virtual machines are disclosed. According to aspects, memory status is obtained for a guest operating system. Based on the obtained memory status, an amount of guest physical addresses is reported to a memory manager of the guest operating system. Moreover, the amount memory assigned to the guest operating system may be adjusted during the runtime operation of the guest operating system.

19 Claims, 11 Drawing Sheets

(56) References Cited

OTHER PUBLICATIONS

"Dynamic Memory," http://docs.hp.com/en/T2767-99067/ch09s06.html, downloaded 2008, 7 pages.
http://serverfault.com/questions/691540/hot-remove-memory-in-a-linux-virtual-machine; "Hot-remove memory in a Linux virtual machine"; Stack Exchange Inc.; ©2017; accessed Mar. 3, 2017; 5 pages.
http://serverfault.com/questions/691540/hot-remove-memory-in-a-linux-virtual-machine; "Hot adding memory in Linux (1012764)"; VMware, Inc.; ©2017; accessed Mar. 3, 2017; 3 pgs.
http://www.vmware.com/content/dam/digitalmarketing/vmware/en/pdf/techpaper/perf-vsphere-memory management.pdf; "Understanding Memory Resource Management in VMware® EXT™ Server"; VMware, Inc.; ©2009; accessed Mar. 3, 2017; 20 pages.

* cited by examiner

DYNAMIC VIRTUAL MACHINE MEMORY MANAGEMENT

BACKGROUND

Virtual machine technology allows for sharing hardware resources between multiple operating systems. An obstacle to achieving high workload consolidation ratios in virtualized environments is per-virtual machine memory usage. Accordingly, techniques for managing per-virtual machine memory usage are desirable.

SUMMARY

An example embodiment of the present disclosure describes a method. In this example, the method includes, but is not limited to obtaining memory status for a guest operating system; and adjusting, based on the obtained memory status, an amount of guest physical addresses reported to a memory manager of the guest operating system. In addition to the foregoing, other aspects are described in the claims, drawings, and text forming a part of the present disclosure.

An example embodiment of the present disclosure describes a method. In this example, the method includes, but is not limited to calculating memory status of a guest operating system from at least physical memory notifications and guest operating system paging information; and adjusting, during the runtime operation of the guest operating system, an amount of memory available to the guest operating system based on at least the memory status of the guest operating system. In addition to the foregoing, other aspects are described in the claims, drawings, and text forming a part of the present disclosure.

An example embodiment of the present disclosure describes a method. In this example, the method includes, but is not limited to effectuating a guest operating system within a child partition, the guest operating system having a priority level; obtaining memory status from the guest operating system; and adjusting an amount of guest physical addresses reported to a memory manager of the guest operating system based on the obtained memory status and the priority level of the guest operating system; and. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
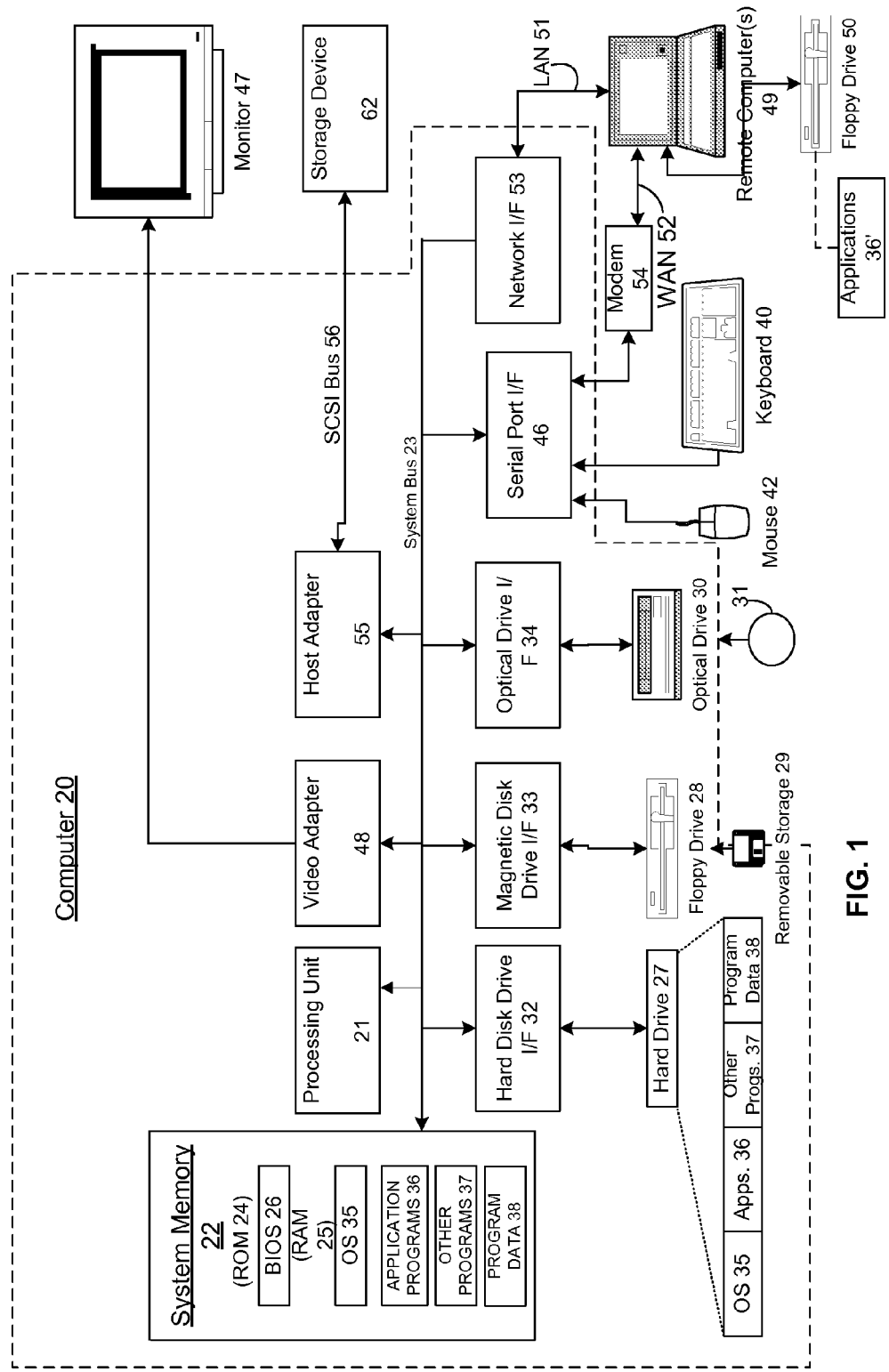
FIG. 1 depicts an example computer system wherein aspects of the present disclosure can be implemented.

Embodiments may execute on one or more computers. FIG. 1 and the following discussion are intended to provide a brief general description of a suitable computing environment in which the disclosure may be implemented. One skilled in the art can appreciate that the computer system of FIG. 1 can in some embodiments effectuate computer 200 of FIG. 2, and FIG. 3. In these example embodiments, the computer 200 can include some or all of the components described in FIG. 1 and circuitry configured to instantiate specific aspects of the present disclosure.

The term circuitry used through the disclosure can include hardware components such as hardware interrupt controllers, hard drives, network adaptors, graphics processors, hardware based video/audio codecs, and the firmware/software used to operate such hardware. In the same or other embodiments the term circuitry can include microprocessors configured to perform function(s) by firmware or by switches set in a certain way. In the same or other example embodiments the term circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate functions is a design choice. Thus, since one of skill in the art can appreciate that a software process can be transformed into an equivalent hardware structure, and a hardware structure can itself be transformed into an equivalent software process, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
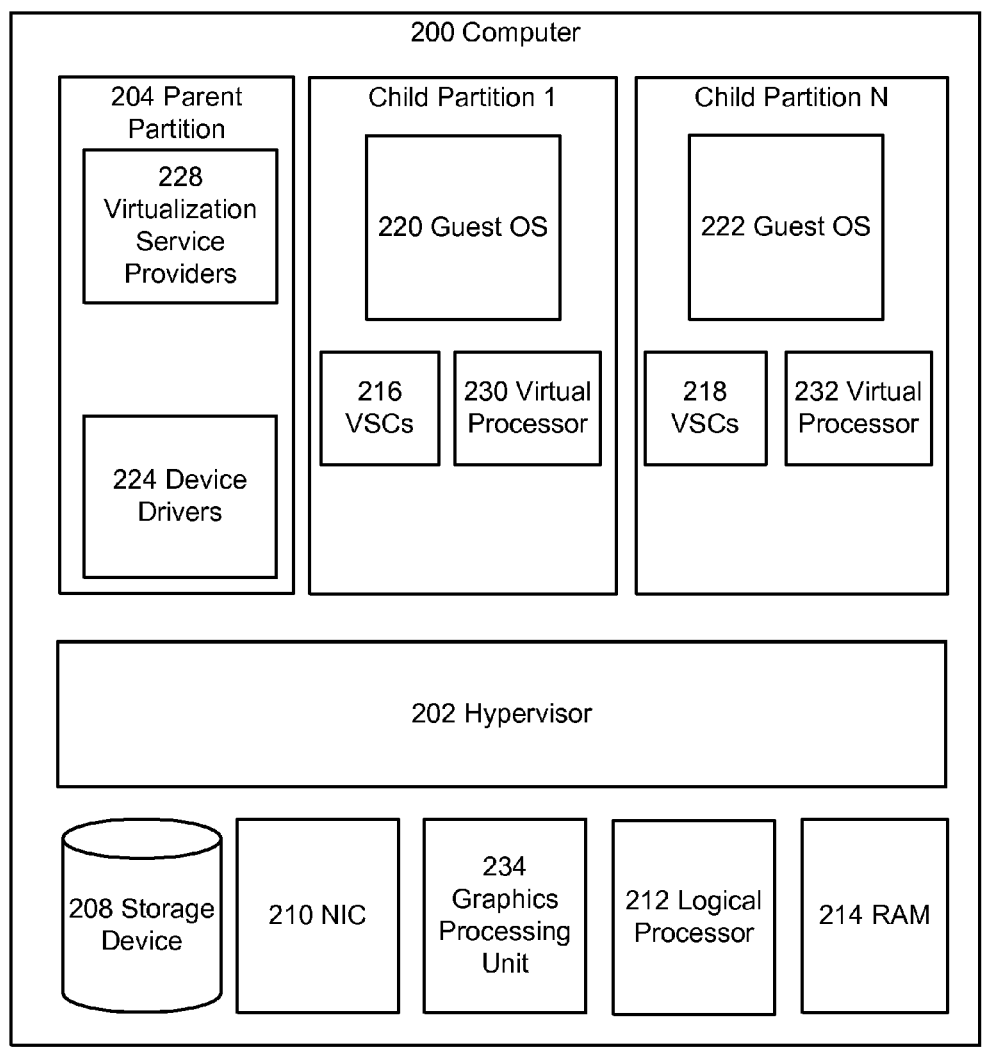
FIG. 2 depicts an operational environment for practicing aspects of the present disclosure.
Figure 3:
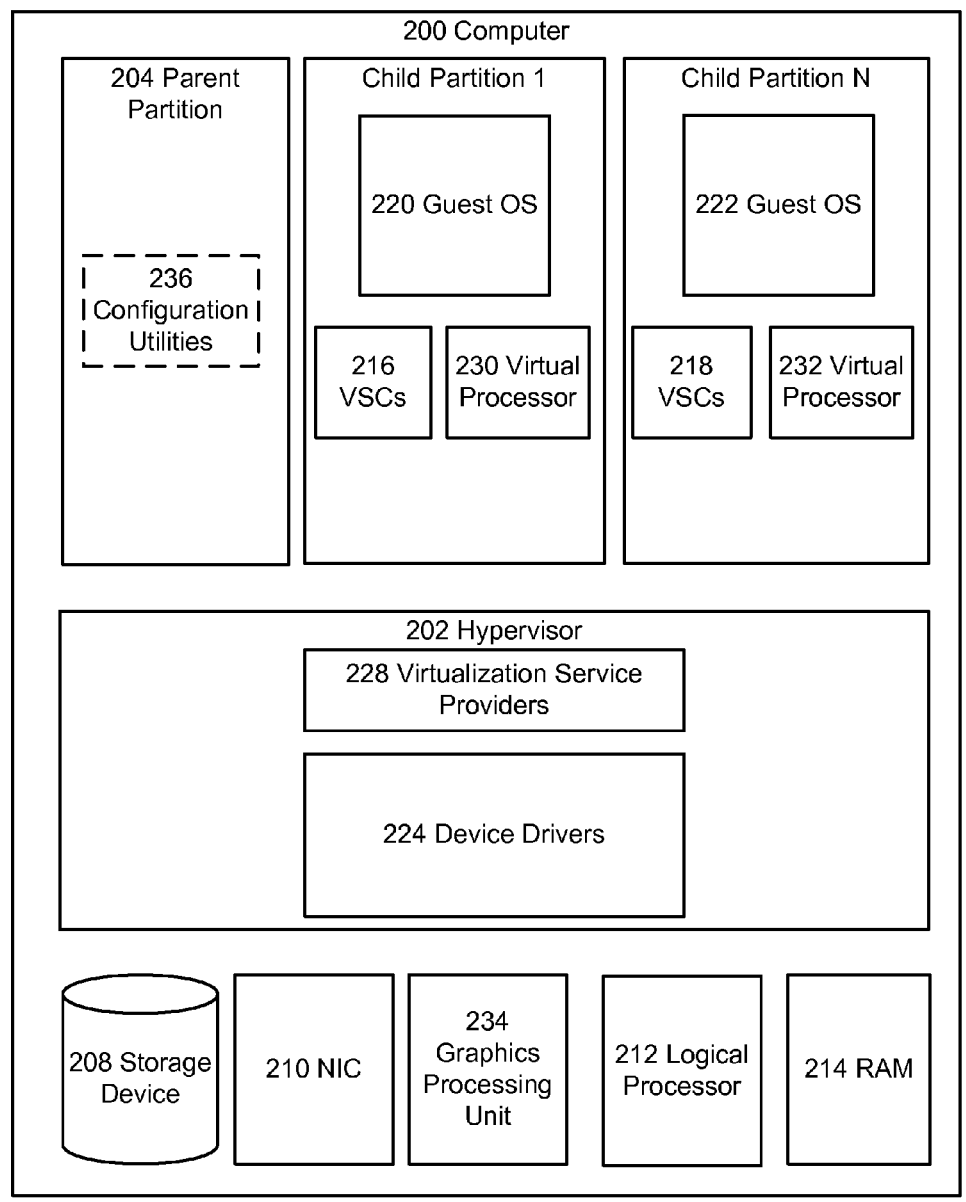
FIG. 3 depicts an operational environment for practicing aspects of the present disclosure.

Referring now to FIGS. 2 and 3, they depict high level block diagrams of computer systems that can be used in embodiments of the present disclosure. As shown by the figure, computer 200 can include physical hardware devices such as a storage device 208, e.g., a hard drive, a network interface controller (NIC) 210, a graphics card 234, at least one logical processor 212, and random access memory (RAM) 214. One skilled in the art can appreciate that while one logical processor is illustrated, in other embodiments computer 200 may have multiple logical processors, e.g., multiple execution cores per processor and/or multiple processors that could each have multiple execution cores. Continuing with the description of FIG. 2, depicted is a hypervisor 202 that may also be referred to in the art as a virtual machine monitor. The hypervisor 202 in the depicted embodiment includes executable instructions for controlling and arbitrating access to the hardware of computer 200. Broadly, the hypervisor 202 can generate execution environments called partitions such as child partition 1 through child partition N (where N is an integer greater than 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition. In embodiments the hypervisor 202 can be a stand-alone software product, a part of an operating system, embedded within firmware of the motherboard, specialized integrated circuits, or a combination thereof.

Continuing with the description of FIG. 2 in the depicted example configuration, the computer 200 includes a parent partition 204 that can be configured to provide resources to guest operating systems executing in the child partitions 1-N by using virtualization service providers 228 (VSPs). In this example architecture the parent partition 204 can gate access to the underlying hardware. Broadly, the VSPs 228 can be used to multiplex the interfaces to the hardware resources by way of virtualization service clients (VSCs). Each child partition can include a virtual processor such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, the combination of the virtual processors and various VSCs in a partition can be considered a virtual machine.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. Each guest operating system 220 through 222 can have associated file systems that can have applications stored thereon such as e-commerce servers, email servers, etc., and the guest operating systems themselves. The guest operating systems 220-222 can schedule threads to execute on the virtual processors 230-232 and instances of such applications can be effectuated.

Referring now to FIG. 3, it illustrates an alternative architecture that can be used. FIG. 3 depicts similar components to those of FIG. 2, however in this example embodiment the hypervisor 202 can include the virtualization service providers 228 and device drivers 224, and the parent partition 204 may contain configuration utilities 236. In this architecture the hypervisor 202 can perform the same or similar functions as the hypervisor 202 of FIG. 2. The hypervisor 202 of FIG. 3 can be a stand alone software product, a part of an operating system, embedded within firmware of the motherboard or a portion of the hypervisor 202 can be effectuated by specialized integrated circuits. In this example the parent partition 204 may have instructions that can be used to configure the hypervisor 204 however hardware access requests may be handled by the hypervisor 202 instead of being passed to the parent partition 204.

Figure 4:
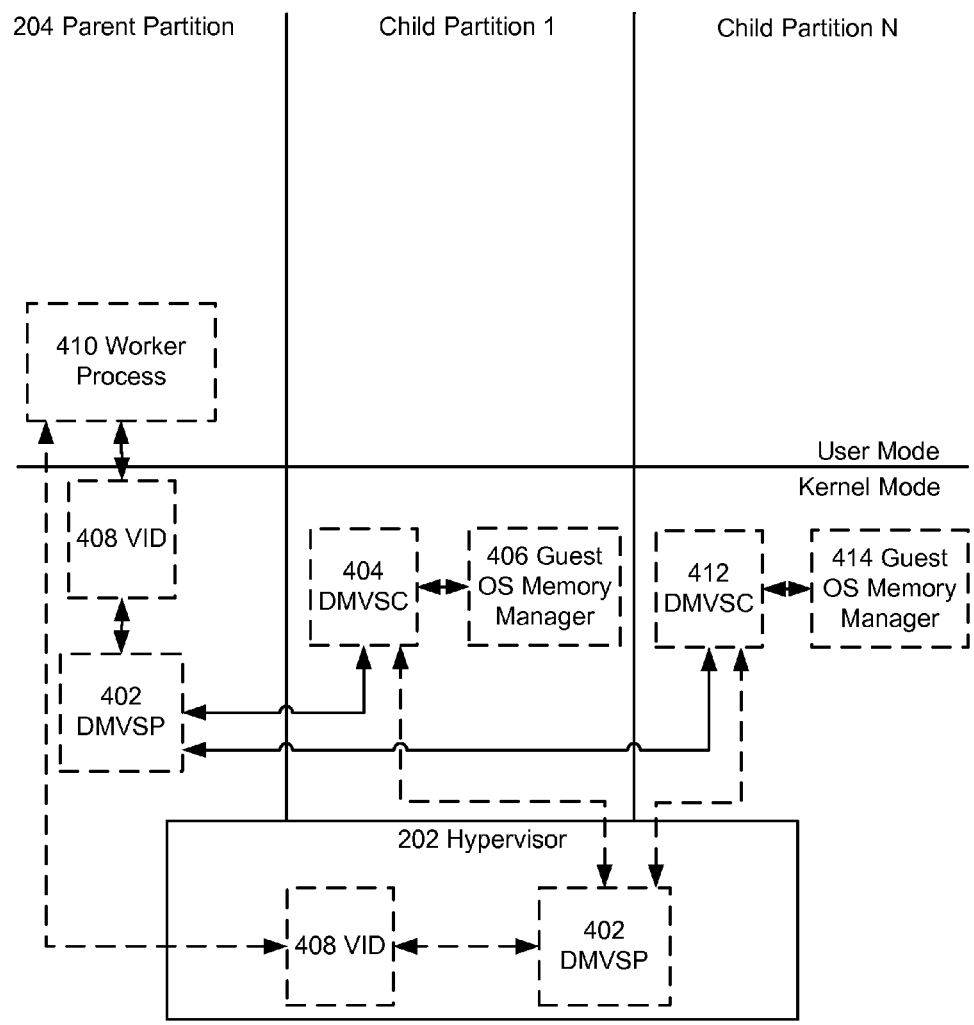
FIG. 4 depicts an operational environment for practicing aspects of the present disclosure.

Referring now to FIG. 4, it illustrates a block diagram environment that can be used in aspects of the present disclosure. As shown by the figure, elements 402-410 are shown in dashed lines, which indicates that they are considered optional and are optionally located at their depicted positions within the figure. More specifically, function described in the following operational flowcharts are optionally performed by the indicated block element and that the disclosure is not limited to embodiments that have specific block elements executing specific operations. Moreover, the disclosure is not limited to embodiments where specific block elements are architecturally located at their depicted locations.

Continuing with the description of FIG. 4, it illustrates a dynamic memory virtualization service provider 402 (DMVSP) that can be used to adjust the amount of memory accessible to a child partition. Broadly, the DMVSP can commit and de-commit memory to partitions using one or more techniques. As shown by the figure the DMVSP 402 can be associated with one or more virtualization service clients, namely dynamic memory virtualization service clients 404 and/or 412 (DMVSCs). Broadly, the DMVSCs 404 and/or 412 can provide information to the DMVSP 402. Each DMVSC can also help commit and de-commit memory from the partition it operates within. The DMVSCs 404, 412, and DMVSP 402 can communicate by way of a virtualization bus described in U.S. patent application Ser. No. 11/128,647, entitled "Partition Bus," the contents of which is incorporated by reference in its entirety.

Continuing with the description of FIG. 4, a worker process 410 is depicted that can manage the child partition (s). The worker process 410 can work in conjunction with the a virtualization infrastructure driver 408 (VID) which can allocate memory to a child partition. Continuing with the high-level description of FIG. 4, each guest operating system 220 and 222 can include a memory manager 406 and 414 which can allocate memory to applications at their request and free the memory when it is no longer needed by the applications.

Figure 5:
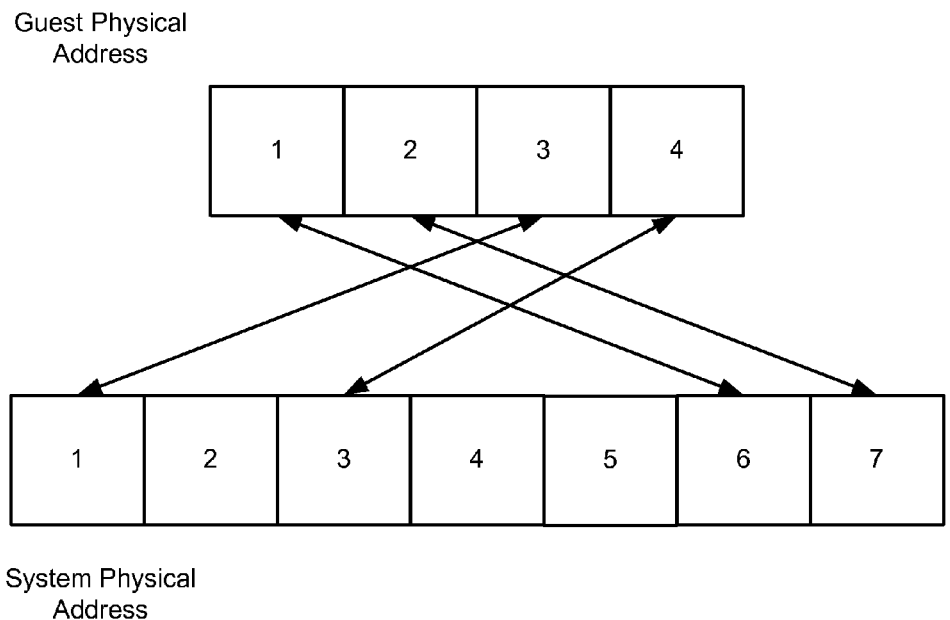
FIG. 5 depicts how memory can be arraigned in embodiments.

Referring now to FIG. 5, it illustrates how memory can be arraigned in embodiments. For example, the memory addresses that memory managers 406 and 414 actually manipulate are guest physical addresses (GPAs) allocated to the guest operating systems by the VID 408. The guest physical address in turn can be backed by system physical addresses (SPAs), e.g., system memory addresses that are managed by the hypervisor 202. As shown by the figure, in an embodiment the GPAs and SPAs can be arranged into memory blocks. Broadly, a memory block can include one or more pages of memory. The relationship between the GPAs and the SPAs can be maintained by shadow page table such those described in commonly assigned U.S. patent application Ser. No. 11/128,665 entitled "Enhanced Shadow Page Table Algorithms," the contents of which is herein incorporated by reference by its entirety. In operation, when a guest operating system stores data in GPA of block 1, the data may actually be stored in a different SPA such as block 6 on the system.

The following are a series of flowcharts depicting implementations of processes. For ease of understanding, the flowcharts are organized such that the initial flowcharts present implementations via an overall "big picture" viewpoint and subsequent flowcharts provide further additions and/or details.

Figure 6:
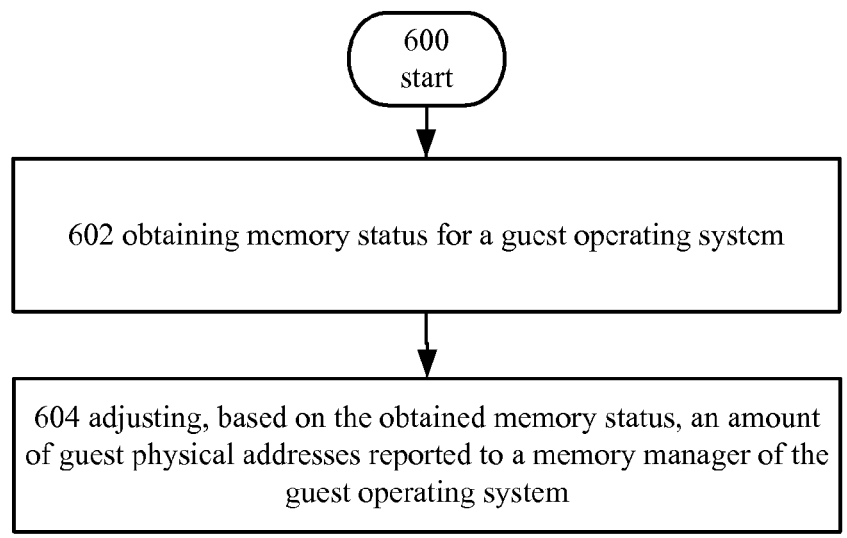
FIG. 6 illustrates an operational procedure for practicing aspects of the present disclosure.

Referring now to FIG. 6, it illustrates an operational procedure including operations 600, 602, and 604. As shown by the figure, operation 600 begins the operational procedure and operation 602 depicts obtaining memory status for a guest operating system. In an embodiment that includes operation 602, memory status for a guest operating system such as guest operating system 220 can be obtained, e.g., generated and/or received. Memory status can identify how performance of the guest is affected by the amount of memory that is available. In an embodiment this information can be calculated during the runtime of the guest operating system by, for example, the DMVSC 404. That is, in a specific embodiment a logical processor 212 of FIG. 2 or 3 can execute instructions indicative of the DMVSC 404 and generate memory status for guest operating system 220. This information can then be sent to the DMVSP 402 for example.

In an example embodiment the memory status information can include a series of values such as 0-4, and each value can identify a different level of memory pressure that the guest OS is experiencing. As the guest operating system becomes more stressed, i.e., as the amount of memory required to efficiently execute the current workload increases, the DMVSC 404 can revise the value and communicate this information to the DMVSP 402. For example, the following table could be used to encode different memory status values:

| Value | Meaning |
|---|---|
| 4 | The guest is in desperate need of memory, e.g., non-paged memory allocations may fail. |
| 3 | The guest is in a low-memory situation; performance is suffering, e.g., significant paging is occurring within the guest. |
| 2 | The guest has sufficient memory for the workload's working set, e.g., little or no paging is occurring. |
| 1 | The guest has sufficient memory for the workload's working set and additional memory is being used opportunistically for in-memory caching, pre-fetching, etc. |
| 0 | The guest has more than enough memory, e.g., memory could be removed without measurably impacting the workload's performance. |

As one skilled in the art can appreciate, the preceding table is exemplary and the disclosure is not limited to embodiments including 5 values, etc.

Memory status of the guest operating system can be calculated from information obtained from a guest operating system memory manger 406. For example, the guest operating system 220 can expose performance counters that provide information as to how well the operating system is performing to the DMVSC 404. This information can be received by the DMCSC 404 and a memory status value can be calculated.

Referring now to operation 604 of FIG. 6, it depicts adjusting, based on the obtained memory status, an amount of guest physical addresses reported to a memory manager of the guest operating system. In an embodiment that includes operation 604, a logical processor 212 can execute instructions indicative of DMVSP 402 and can adjust the amount of guest physical addresses reported to the memory manager 406 of guest operating system 220. That is, the DMVSP 402 can adjust the amount of address spaces that are detected by the memory manager 406. In an example embodiment the logical processor 212 can operate to commit or de-commit memory based on the memory pressure that the guest OS is experiencing, e.g., if guest operating system 220 is stressed, memory can be committed.

In an embodiment, when the logical processor 212, configured by DMVSP 402, determines to commit or de-commit memory it can do so on a per memory block basis. For example, the DMVSP 402 can commit/de-commit a memory block and check how the memory status changes. If memory status has not changed, the DMVSP 402 can commit/de-commit another memory block.

In an embodiment an amount of guest physical addresses reported to a memory manager can be accomplished using a hot-add operation. For example, certain operating systems can support a hot-add, which allows ranges of physical memory to be added to a running operating system without requiring a system reboot. That is, the memory manager 406 can be configured to support dynamic addition of memory to a running system. In a hot-add embodiment, the DMVSC 404 can be configured to access a hot-add interface of the memory manager 406 and the DMVSC 404 can send a message to the operating system that describes the hot-added GPAs. The memory manager 406 can then make the new memory available to the guest operating system 220, drivers, and/or applications. For example, the DMVSC 404 can receive the hot-added memory addresses from the DMVSP 402 after the VID 408 generates the relationships between GPAs and SPAs.

Similarly, a hot-remove operation can be used to remove detected memory addresses from the memory manager 406. For example, the DMVSC 404 can send a message to the guest operating system 220 that indicates that memory has been hot-removed. The DMVSC 404 can request that the memory manager 406 provide pages of GPAs for removal. In this example the DMVSC 404 can then call a removal API of the memory manager 406 and remove the GPAs from the guest operating system 220. In an embodiment where hot-remove is used, the memory that is removed is not counted against the guest current commit, and the guest memory manager 406 can adjust its internal counters using similar techniques that are used by an operating system to remove memory that is physically removed from a motherboard.

Figure 7:
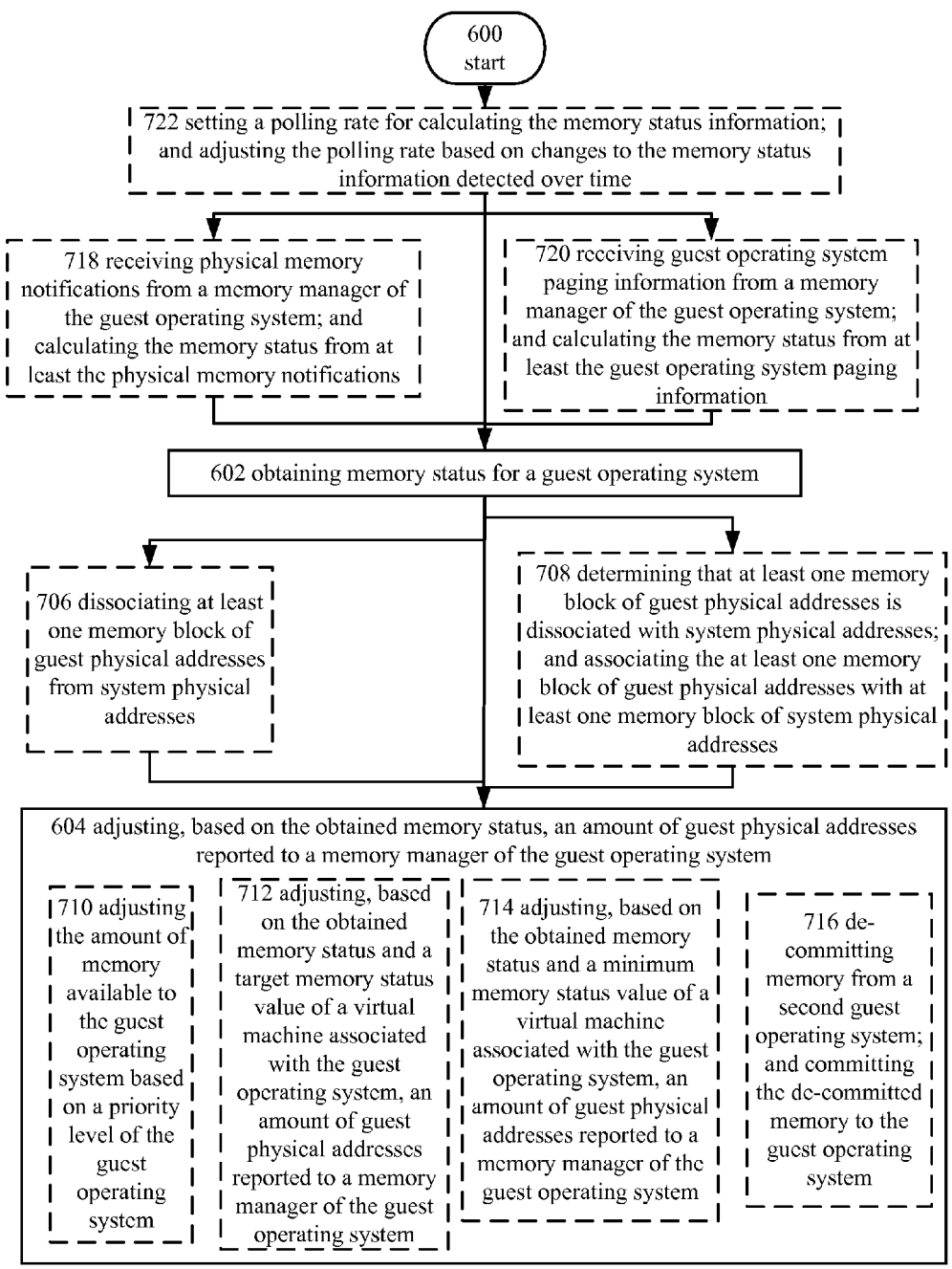
FIG. 7 illustrates an alternative embodiment of the operational procedure 600 of FIG. 6.

Referring now to FIG. 7, it illustrates an alternative embodiment of the operational procedure 600 of FIG. 6 including the additional operations 706, 708, 710, 712, 714, 716, 718, 720, and 722. As shown by the figure, and throughout the disclosure, additional operations are shown in dashed lines which is indicative of the fact that they are considered optional.

Referring now to operation 706, it illustrates dissociating at least one memory block of guest physical addresses from system physical addresses. In this example, memory can be de-committed by, for example dissociating guest physical addresses from physical addresses. That is, memory can be ballooned in an embodiment. For example, logical processor 212 can execute instructions indicative of the DMVSC 404 and can send a message to the memory manager 406 requesting that the memory manager 406 reserve a certain amount of memory for use by the DMVSC 404, e.g., one or more memory blocks. The memory manager 406 can lock memory for exclusive use within the DMVSC 404 and the DMVSC 404 can send the GPAs of the memory to the DMVSP 402. In this example the DMVSP 402 can send the GPAs to the VID 408 and the VID 408 can remove entries for these GPAs to SPAs in the shadow page table. In this example, the guest operating system memory manager 406 may include information that identifies that the GPAs are still valid, however in actuality the GPAs are no longer backed by system physical addresses. In this example the memory manager 406 won't use the locked GPAs and the SPAs backing them can be reallocated.

Referring to operation 708, it illustrates determining that at least one memory block of guest physical addresses is dissociated with system physical addresses; and associating the at least one memory block of guest physical addresses with at least one memory block of system physical addresses. In this example memory addresses can be dissociated from physical addresses. In this example scenario the technique used to commit memory to the guest OS 220 can involve backing GPAs that are allocated to the DMVSC 404 with SPAs. For example, GPAs may be reserved by the DMVSC 404 and the SPAs may be reallocated to either another guest operating system or an operating system executing in the parent partition 204. In this example a request to commit memory pages can be received by the VID 408 and the VID 408 can obtain SPAs to satisfy the request and send the range of addresses to the DMVSP 402. In an embodiment the VID 408 can be configured to obtain a contiguous range of SPAs in order to increase system efficiency. In this example the VID 408 can determine that the guest operating system 220 has GPAs that are locked for exclusive use by the DMVSC 404. The VID 408 can create relationships between the locked GPAs and the SPAs and send a message to the DMVSP 402. The DMVSP 402 can then send a message to the DMVSC 404 and the DMVSC 404 can send a message to the memory manager 406 indicating that the GPAs can be unlocked and returned to a memory pool of the memory manager 406.

In an embodiment the VID 408 can determine whether to use a hot-add technique or a ballooning technique depending on whether GPAs are ballooned in the guest operating system 220. For example, when the VID 408 receives SPAs to commit to the guest it can determine whether any GPAs are locked by the DMVSC 404. In the instance that there are locked GPAs, the VID 408 can back them with SPAs before it hot-adds memory. Before memory is committed to the guest operating system it can be zeroed and its associated cache lines can be flushed for security reasons. By zeroing the memory the contents of memory previously associated with one partition do not leak to another partition.

Continuing with the description of FIG. 7, operation 710 illustrates that operation 604 can include adjusting the amount of memory available to the guest operating system based on a priority level of a virtual machine associated with the guest operating system. For example, in an embodiment that includes operation 710 the amount of memory available to the guest operating system can be adjusted based on the priority of the virtual machine associated with the guest OS. For example, in an instance where multiple virtual machines are executing, each virtual machine can have an associated priority level that identifies its relative importance. The priority level is a user-configurable value that indicates the importance of performance versus memory savings. The priority levels can be encoded as integer values, e.g., from 0 to 4 using, for example, the table below.

| Memory Priority | Description |
|---|---|
| 0 | Make aggressive attempts to minimize the memory of the guest, e.g., lower memory utilization is favored over performance. |
| 1 | Make moderate attempts to minimize the memory of the guest, e.g., lower memory utilization is favored over performance. |
| 2 | Lower memory utilization is generally favored over performance. |
| 3 | Balance performance and memory policies. |
| 4 | Favor high performance over low memory utilization. |

The DMVSP 402 can use these values to determine how to distribute the memory in the system. For example, guest operating system 220 may run an e-commerce website that is the lifeblood of a company and guest operating system 222 may run an unimportant intranet website. In this specific example an administrator may determine that the e-commerce website is higher priority than the intranet and assign guest operating system 220 a higher priority level, e.g., priority 4, than the intranet site, e.g., 0.

When operation 604 includes operation 710, the DMVSP 402 can operate to reduce memory pressure in the virtual machines based on their priority levels. For example, a virtual machine having a priority of 4 and a memory pressure value of 2 may receive additional memory whereas a virtual machine that has a priority of 1 with a memory pressure of 3 may not receive additional memory.

Continuing with the description of FIG. 7, in an embodiment operation 604 can include operation 712 which depicts adjusting, based on the obtained memory status and a target memory status value of a virtual machine associated with the guest operating system, an amount of guest physical addresses reported to a memory manager of the guest operating system. In this example the amount of guest physical addresses assigned to a guest operating system can be adjusted using the memory status of the guest and a target memory status value. For example, each virtual machine can be assigned a target pressure value and target pressure values can be stored in a data structure that can be accessed by the DMVSP 402. Current pressure values of the running virtual machines can then be received. The DMVSP 402 may serially step through the list of running virtual machines and commit memory in order to reduce the memory pressure values to the target values, and de-committing memory to increase the pressure to the target values.

Referring again to FIG. 7, operation 714 illustrates that operation 604 can include adjusting, based on the obtained memory status and a minimum memory status value of a virtual machine associated with the guest operating system, an amount of guest physical addresses reported to a memory manager of the guest operating system. In this example the amount of guest physical addresses assigned to a guest operating system can be adjusted using the memory status of the guest and a minimum memory status value. For example, the DMVSP 402 can receive the current memory status value and the DMVSP 402 can include a data structure that identifies a minimum pressure value for each virtual machine. In this example, the DMVSP 402 may serially step through a list of running virtual machines and commit memory to guest operating systems in order to reduce each virtual machine's memory pressure to its associated minimum value, and de-commit memory to increase each virtual machine's pressure values to its associated minimum value.

In a specific example the DMVSP 402 can compare the current memory status value to a table of information that indicates a minimum value for the virtual machines and adjust the memory until the memory status values are equal to the minimum values. For example, an administrator may configure a guest operating system that runs a critical application to have a low minimum value.

In an embodiment that includes both operation 712 and 714, the minimum value can be lower than the target value. For example, when there is enough memory available, the DMVSP 402 can commit memory to a guest operating system in order to reduce the pressure to the minimum. That is, the DMVSP 402 can attempt to maximize performance across running virtual machines. However, when there is insufficient memory to achieve minimal pressure levels for the virtual machines, the DMVSP 402 can attempt to achieve target pressure values for each virtual machine.

Continuing with the description of FIG. 7, operation 604 can additionally include operation 716 which shows de-committing memory from a second guest operating system; and committing the de-committed memory to the guest operating system. For example, in an embodiment where at least two guest operating systems are executing within virtual machines, the DMVSP 402 can be configured to de-commit memory from, for example, guest operating system 222 and commit the memory to guest operating system 220. For example, in an embodiment the DMVSP 402 can attempt to free up memory from the guest operating system 222 when, for example, there is no available memory available in the parent partition that can be committed. In this example the DMVSP 402 can check the other virtual machines in, for example, order of memory priority starting with the lowest-priority VMs. If, for example, the memory status of guest operating system 222 indicates that the memory pressure is less than its target threshold, the DMVSP 402 can initiate a memory de-commit. If memory is de-committed from a VM, an asynchronous message can be sent to the DMVSC 404 directing it to de-commit memory. When the DMVSC 412 associated with guest OS 222 responds, it can indicate new memory status within the guest operating system 222. In some cases, the memory pressure will be increased in response to the memory removal. Once the memory is free, it can be committed to guest operating system 220.

Continuing with the description of FIG. 7, operation 718 shows receiving physical memory notifications from a memory manager of the guest operating system; and calculating the memory status from at least the physical memory notifications. For example, in an embodiment the DMVSC 404 can be configured to use performance counters to calculate the memory status of the guest operating system 220. In an embodiment, a performance counter can be a physical memory notification. For example, the DMVSC 404 can receive physical memory notifications from the memory manager 406 and use this to compute the memory status of the guest operating system 220. For example, the memory manager 406 can output high-memory notifications and low-memory notifications based on activity in the guest operating system. The memory manager 406 can trigger these notifications based on a low-memory threshold (LMT) and a high-memory threshold (HMT). In a specific example embodiment, the default level of available memory that signals a low-memory-resource notification event can be approximately 32 MB per 4 GB, to a maximum of 64 MB. The default level that signals a high-memory-resource notification event can be, for example, three times the default low-memory value. Intermediate memory availability levels between the two can be determined by dividing the interval between the high-memory threshold and low-memory threshold levels. One skilled in the art can appreciate that these values are exemplary and that changes can be made without departing from the spirit of the disclosure.

Continuing with the description of operation 718, these notifications can be used by the DMVSC 404 to calculate the memory status of the guest operating system 220. For example, each level can be associated with a value, e.g., 0-4 and if any other performance counters are taken into account they can also be associated with values. The values for each performance counter can then be used to calculate the current memory status of the guest. In a specific example, the memory status can be calculated by taking the higher or lower of the performance counter values. In another example the average value of the performance counters can be used as the memory status. In yet another embodiment a more sophisticated algorithm can be used to calculate the memory status that takes into account the previous performance counter values and assigns each performance counter a scalar to affect its relative weight in the calculation.

Continuing with the description of FIG. 7, operation 720 shows receiving guest operating system paging information from a memory manager of the guest operating system; and calculating the memory status from at least the guest operating system paging information. For example, in an embodiment the DMVSC 404 can be configured to receive operating system paging information from the memory manager 406 and use this to compute the memory status of the guest operating system 220. For example, guest operating system paging rates can be monitored through two counters that are exposed by memory manager 406 and a cache manager, namely the paging rate and the cache rotation rate. The values that are received by the DMVSC 404 can be associated with different values and an algorithm can be used to generate a performance level counter value, e.g., from 0-4.

Similar to that described above, the paging information values can be taken into account along with other performance counter values. The values for each performance counter and the memory status value can then be calculated using techniques described above with respect to operation 718.

Referring now to operation 722, it depicts setting a polling rate for calculating the memory status information; and adjusting the polling rate based on changes to the memory status information detected over time. In an embodiment that includes operation 722, the rate by which the DMVSC 404 calculates the memory status can adapt to memory status fluctuations within the child. In this example the DMVSC 404 can change a timer period that can be used to trigger polling of the performance counters based on child activity. In one specific example, the period can increased if no memory pressure change is detected. In this example the initial period can be set to, for example, 2 seconds. At the end of the timeout, memory status can be calculated. If the memory status has changed, the timer can be reset and the DMVSP 402 can be notified. If the memory status of the guest operating system 220 has not changed, the counter can be incremented. The timer period can be capped.

Figure 8:
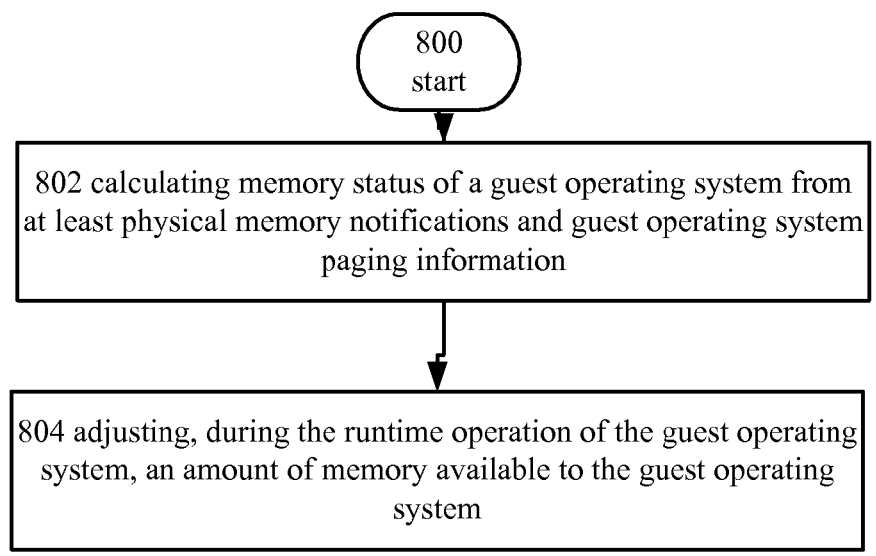
FIG. 8 illustrates an operational procedure for practicing aspects of the present disclosure.

Referring now to FIG. 8, it illustrates an operation procedure including operations 800, 802, and 804. As shown by the figure, operation 802 begins the operational procedure and operation 802 depicts calculating memory status of a guest operating system from at least physical memory notifications and guest operating system paging information. In an embodiment a guest operating system 220 can be executed within a child partition such as child partition 1. In this example a computer 200 can include hardware such as a logical processor 212 and the processor 212 can execute instructions that effectuate a guest operating system 220. In this example memory status of the guest operating system can be calculated from physical memory notifications, e.g., messages output by the memory manager 406 indicating memory activity within the guest OS 220, and paging information. Values can be associated with memory notifications and paging information and a memory status value can be calculated. In a specific example, the memory status can be calculated by taking the higher or lower value. In another example the average value can be used as the memory status. In yet another embodiment a more sophisticated algorithm can be used to calculate the memory status that takes into account the previous values and assigns each performance counter a scalar to affect its relative weight in the calculation.

Continuing with the description of FIG. 8, operation 804 shows adjusting, during the runtime operation of the guest operating system, an amount of memory available to the guest operating system based on at least the memory status of the guest operating system. In an embodiment a DMVSP 402 can adjust the amount of memory guest operating system 220 has during its runtime operation. For example, the DMVSP 402 can commit and de-commit memory from the guest operating system on a per-memory-block basis based on the memory status value calculated in operation 802.

Figure 9:
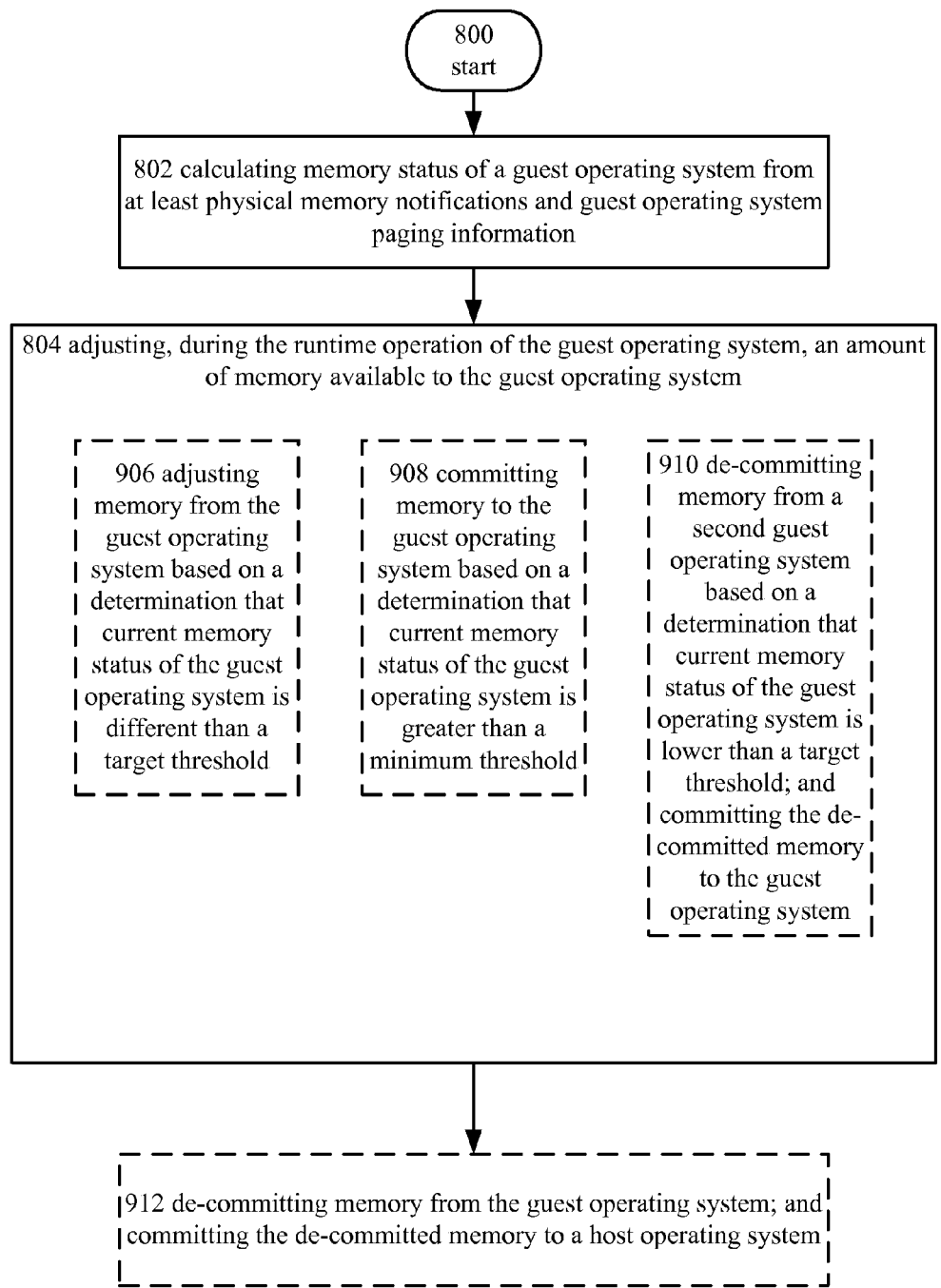
FIG. 9 illustrates an alternative embodiment of the operational procedure 800 of FIG. 8.

Referring now to FIG. 9, it depicts an alternative embodiment of the operational procedure 800 of FIG. 8 including additional operations 906, 908, 910, and 912. As shown by the figure, in an embodiment operation 804 can include operation 906 that illustrates adjusting memory from the guest operating system based on a determination that current memory status of the guest operating system is different than a target threshold. In an embodiment that includes operation 906, the DMVSP 402 can de-commit or commit memory from or to a guest operating system 220 when the memory status is different than a target value. Similar to that described above, the DMVSP 402 can obtain, e.g., receive or generate, memory status information that identifies how performance of the guest is affected by the amount of memory available to it. In this example the DMVSP 402 can compare the current memory status value to a table of information that indicates a target value for the virtual machine and adjust the memory until the memory status of the virtual machine is equal to the target. The target value can be set by an administrator.

Continuing with the description of FIG. 9, in an embodiment operation 804 can include operation 908 that illustrates committing memory to the guest operating system based on a determination that current memory status of the guest operating system is greater than a minimum threshold. In an embodiment that includes operation 908, the DMVSP 402 can commit memory to a guest operating system 220 when the memory status is greater than a minimum threshold, e.g., current memory status is 3 and the minimum is 2. Similar to that described above, the DMVSP 402 can obtain memory status information that identifies how performance of the guest is affected by the amount of memory available. In a specific example the memory status information can be a value. In this example the DMVSP 402 can compare the current memory status value to a table of information that indicates a minimum value for the virtual machine and adjust the memory until the memory status of the virtual machine is equal to the minimum. For example, an administrator may configure a guest operating system that runs a critical application to have a low minimum value. In an embodiment that includes both operation 908 and 906, the minimum value can be lower than the target value. When there is enough memory available, the DMVSP 402 can commit memory to the guest operating system 220 in order to reduce the pressure to the minimum. That is, the DMVSP 402 can attempt to maximize performance across running virtual machines. However, when there is insufficient memory to achieve minimal pressure levels for the virtual machines, the DMVSP 402 can attempt to achieve target pressure values for each virtual machine.

Continuing with the description of FIG. 9, in an embodiment operation 804 can include operation 910 that illustrates de-committing memory from a second guest operating system based on a determination that current memory status of the guest operating system is lower than a target threshold; and committing the de-committed memory to the guest operating system. For example, in an embodiment where at least two guest operating systems are executing within virtual machines, the DMVSP 402 can be configured to de-commit memory from guest operating system 222 and commit the memory to guest operating system 220 when the memory status of guest operating system 222 is lower than a target threshold, e.g., memory status of guest operating system 222 may be 0 and the target may be 3. For example, in an embodiment the DMVSP 402 can attempt to free up memory from the guest operating system 222 when, for example, there is no memory available in the parent partition that can be committed and guest operating system 220 is experiencing unacceptable pressure. In an example embodiment, the DMVSP 402 can check the other virtual machines in order of memory priority starting with the lowest-priority VMs. If, for example, the memory status of guest operating system 222 indicates that the memory pressure is lower than its target threshold the DMVSP 402 can initiate a memory de-commit. If memory is de-committed from a VM, an asynchronous message can be sent to the DMVSC 412 directing it to de-commit memory. When the DMVSC 412 associated with guest OS 222 responds, it can indicate new memory status within the guest operating system 222. In some cases, the memory pressure may be increased in response to the memory removal. Once the memory is free it can be committed to guest operating system 220 and its memory status can be checked to see if it has lowered to its target.

Referring now to operation 912, it depicts de-committing memory from the guest operating system; and committing the de-committed memory to a host operating system. In an example embodiment a host operating system can be executing within, for example, the parent partition 204. Referring to FIG. 2, in an example implementation the host operating system can include the virtualization service providers 228. That is, the host operating system can include the DMVSP 402 in an embodiment. In another embodiment, however, the DMVSP 402 can be part of the hypervisor 202 as shown by FIG. 3. In either embodiment, the memory status of the host operating system can be monitored by the DMVSP 402 and memory can be de-committed from the guest operating systems 220 and/or 222 in order to reallocate it to the host operating system when the host operating system is experiencing pressure.

Figure 10:
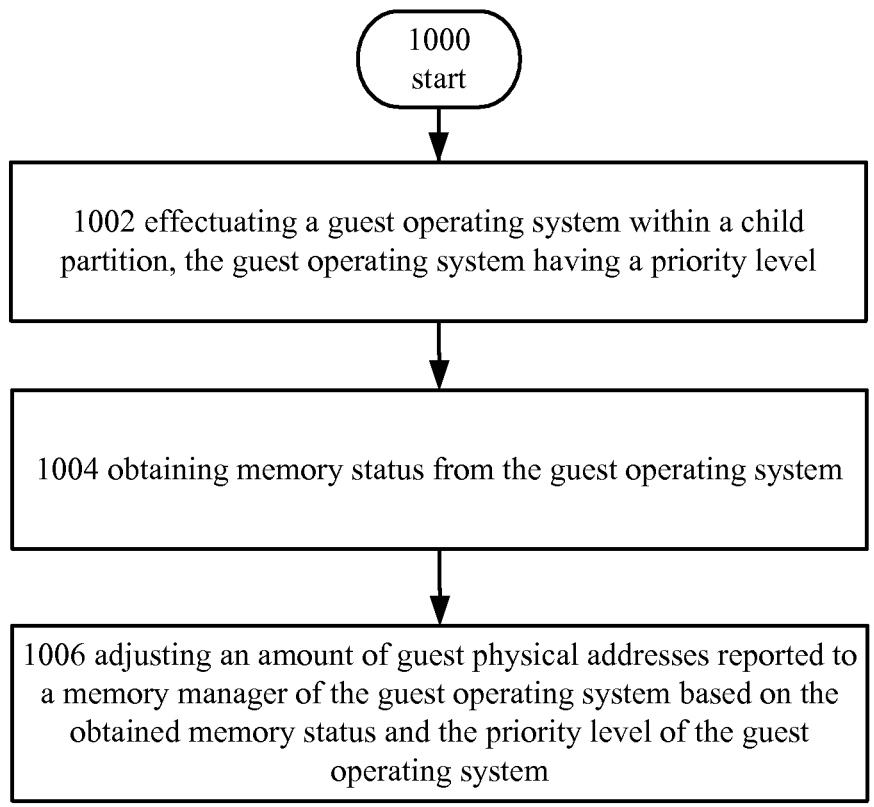
FIG. 10 illustrates an operational procedure for practicing aspects of the present disclosure.

Referring now to FIG. 10, it illustrates an example operational procedure including operations 1000, 1002, 1004, and 1006. As shown by the figure, operation 1000 begins the process and operation 1002 depicts effectuating a guest operating system within a child partition, the guest operating system having a priority level. In an embodiment a guest operating system 220 can be executed within a child partition such as child partition 1. In this example, a computer 200 can include hardware such as a logical processor 212, and the processor 212 can execute instructions that effectuate a guest operating system 220. The child partition can have an associated priority level that identifies its relative importance. For example, the priority level can be a user-configurable value that indicates the importance of performance versus memory savings and the priority can encoded as an integer value. The DMVSP 402 can use these values to determine how to distribute memory in the system.

Continuing with the description of FIG. 10, operation 1004 shows obtaining memory status from the guest operating system. In an embodiment, memory status information for a guest operating system 220 can be obtained, e.g., received or generated. Memory status information can identify how performance of the guest is affected by the amount of memory that is available to it. This information can be generated during the runtime of the guest operating system by, for example, the DMVSC 404. That is, a logical processor 212 of FIG. 2 can execute instructions indicative of the DMVSC 404 and generate memory status information for guest operating system 220.

In an example embodiment the memory status information can include a series of values such as those described above, and each value can identify a different level of memory pressure that the guest OS is experiencing. As the guest operating system becomes more stressed, the DMVSC 404 can revise the value and communicate this information to the DMVSP 402.

Continuing with the description of FIG. 10, operation 1006 illustrates adjusting an amount of guest physical addresses reported to a memory manager of the guest operating system based on the obtained memory status and the priority level of the guest operating system. In an embodiment that includes operation 1006, a logical processor 212 can execute instructions indicative of a DMVSP 402 and can adjust the amount of guest physical addresses that are reported to the memory manager 406 of guest operating system 220. That is, the DMVSP 402 can adjust the amount of address spaces that are detected by the memory manager 406. In an example embodiment the logical processor 212 can operate to commit or de-commit memory based on the memory pressure that the guest OS is experiencing, e.g., if guest operating system 220 is stressed, memory can be committed.

In this example, the DMVSP 402 can operate to adjust the memory available to guest operating system based on the virtual machine's priority and the guest operating system's memory status. For example, virtual machines having higher priority and that are under higher memory stress can receive adjustments before other virtual machines. For example, when the processor 212 executes the DMVSP 402 it can be configured to sort the running virtual machines by priority; and then adjust the memory of the virtual machines with the highest priority that are experiencing high memory pressure.

In an embodiment, when the DMVSP 402 determines to commit or de-commit memory it can do so on a per-memory-block basis. In this example, the DMVSP 402 can commit/de-commit a memory block and check how the memory status information changes. If memory status has not changed, the DMVSP 402 can commit/de-commit another memory block.

Figure 11:
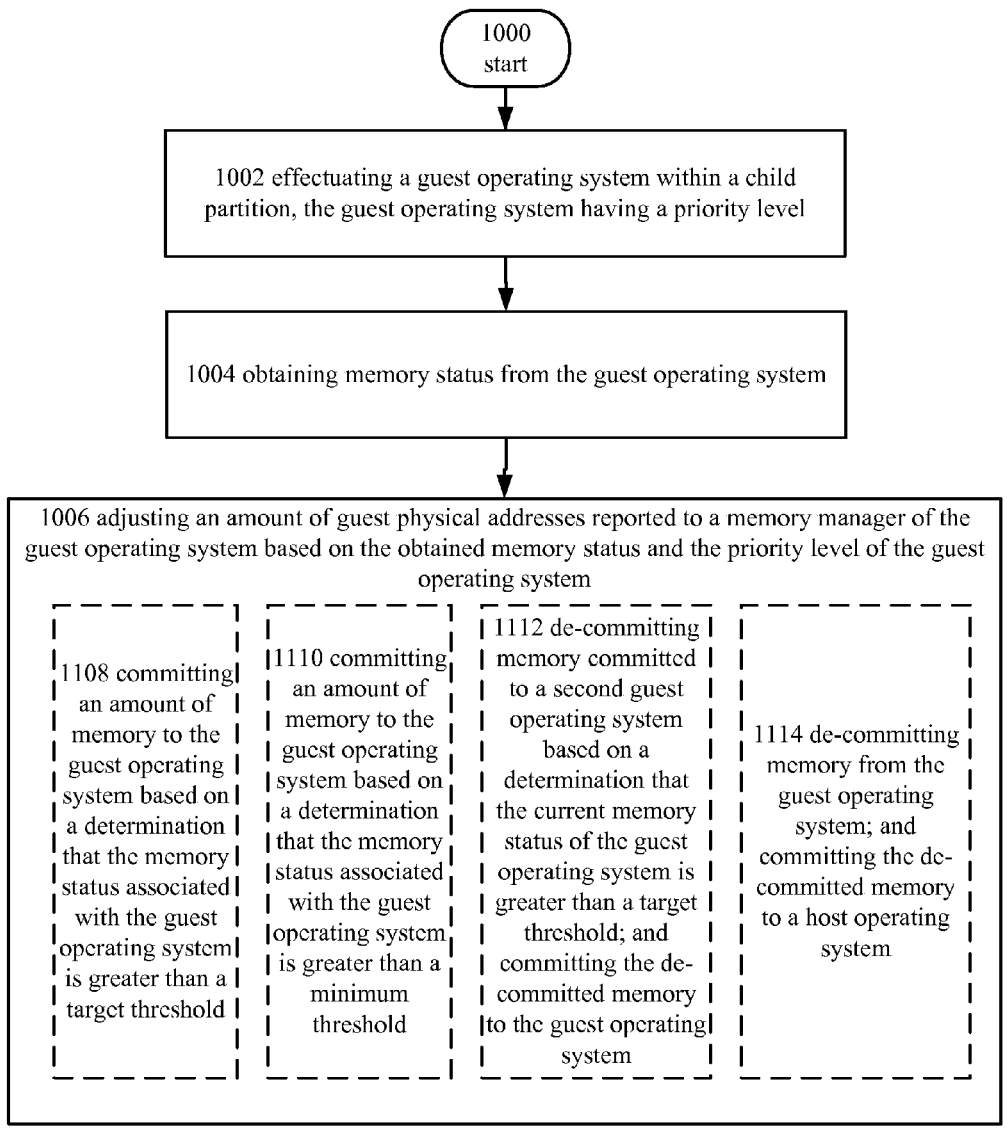
FIG. 11 illustrates an alternative embodiment of the operational procedure 1000 of FIG. 10.

Referring now to FIG. 11, it illustrates an alternative embodiment of the operational procedure of FIG. 10 including the additional operations 1108, 1110, 1112, and 1114. Referring now to operation 1108, it depicts an alternative embodiment to operation 1006 where the operation includes committing an amount of memory to the guest operating system based on a determination that the memory status associated with the guest operating system is greater than a target threshold. For example, the DMVSP 402 can be executed by logical processor 212, and the processor 212 can determine that the memory status of guest operating system 220 is greater than a target amount, e.g., the current memory status could be 3 and the target could be 2. In this example, the DMVSP 402 can commit memory, e.g., one or more memory blocks, to relieve memory pressure in the guest operating system 220. In this example, the DMVSP 402 may sort the virtual machines by their priority and serially step through the list by committing memory to the guest operating systems that have less memory than their target amounts.

Continuing with the description of FIG. 11, operation 1110 illustrates an alternative embodiment to operation 1006 where operation 1006 includes committing an amount of memory to the guest operating system based on a determination that the memory status associated with the guest operating system is greater than a minimum threshold. For example, in an embodiment the DMVSP 402 can be executed by logical processor 212, and the logical processor 212 can commit additional memory to the guest operating system 220 in order to attempt to lower the pressure from, for example, the target, to the minimum. That is, in an embodiment including operation 1006 the DMVSP 402 can be executed, and the list of virtual machines can be sorted according to their priority levels. The virtual machines having the highest priority can have memory committed to them in order to attempt to decrease the memory status to the minimum levels. In an embodiment including both operation 1004 and 1006, the DMVSP 402 can be configured to first attempt to reduce the memory pressure in each virtual machine to the target level and then if there is still memory available it can be allocated to the virtual machines in order to attempt to reduce the memory pressure to the minimum levels. In another embodiment, the DMVSP 402 can be configured to first attempt to reduce the memory pressure in each virtual machine to the minimum level and then, if there is not enough memory available, it can instead attempt to reduce the memory pressure in each virtual machine to the target level.

Referring now to operation 1112, it depicts an alternative embodiment of operation 1006 where it includes de-committing memory committed to a second guest operating system based on a determination that the current memory status of the guest operating system is greater than a target threshold; and committing the de-committed memory to the guest operating system. For example, in an embodiment where at least two guest operating systems are executing within virtual machines, the DMVSP 402 can be configured to de-commit memory from guest operating system 222 and commit the memory to guest operating system 220 when the memory status of guest operating system 220 is greater than a target threshold. For example, in an embodiment the DMVSP 402 can attempt to free up memory from the guest operating system 222 when, for example, there is no memory available in the parent partition that can be committed and the priority of guest operating system 220 is greater than guest operating system 222. In an example embodiment, the DMVSP 402 can check the other virtual machines in order of memory priority starting with the lowest-priority VMs. If, for example, the memory status of guest operating system 222 indicates that the memory pressure is less than its target threshold, the DMVSP 402 can initiate a memory de-commit. If memory is de-committed from a VM, an asynchronous message can be sent to the DMVSC 414 directing it to de-commit memory. When the DMVSC 414 associated with guest OS 222 responds, it can indicate new memory status within the guest operating system 222. In some cases, the memory pressure will be increased in response to the memory removal. Once the memory is free, it can be committed to guest operating system 220 and its memory status can be checked to see if it has lowered to its target.

Continuing with the description of FIG. 11, operation 1114, it depicts an alternative embodiment of operation 1006 where it includes de-committing memory from the guest operating system; and committing the de-committed memory to a host operating system. In an example embodiment, a host operating system can be executing within, for example, the parent partition 204. Referring to FIG. 2, in an example implementation the host operating system can include the virtualization service providers 228. That is, the host operating system can include the DMVSP 402 in an embodiment. In another embodiment, however, the DMVSP 402 can be part of the hypervisor 202 as shown by FIG. 3. In either embodiment, the memory status of the host operating system can be monitored by the DMVSP 402, and memory can be de-committed from the guest operating systems 220 and/or 222 in order to reallocate it to the host operating system.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer readable storage device, comprising:
instructions for receiving notifications from within a guest operating system and configured to monitor activities of a guest operating system of a virtual machine, to determine an amount of guest physical addresses associated with the guest operating system, and to trigger the notifications, the virtual machine comprising the memory manager, the guest operating system of the virtual machine executing the memory manager to monitor the activities from within the guest operating system, determine the amount of guest physical addresses from within the guest operating system, and trigger the notifications from within the guest operating system, each notification from the notifications being triggered based on a comparison of the determined amount of guest physical addresses and a predefined amount;
instructions for determining a memory status from the values associated with the triggered notifications, the memory status indicating a memory pressure in the memory assigned to the guest operating system; and
instructions for adjusting, based on the determined memory status, the amount of guest physical addresses determined by the memory manager.

2. The computer readable storage medium of claim 1, further comprising:
instructions for dissociating at least one memory block of guest physical addresses from system physical addresses.

3. The computer readable storage medium of claim 1, further comprising:
instructions for determining that at least one memory block of guest physical addresses is dissociated with system physical addresses; and
instructions for associating the at least one memory block of guest physical addresses with at least one memory block of system physical addresses.

4. The computer readable storage medium of claim 1, wherein the instructions for adjusting, based on the determined memory status, the amount of guest physical addresses determined by the memory manager further comprise:
instructions for adjusting the amount of guest physical addresses based on a priority level of a virtual machine associated with the guest operating system.

5. The computer readable storage medium of claim 1, wherein the instructions for adjusting, based on the determined memory status, the amount of guest physical addresses determined by the memory manager further comprise:
instructions for adjusting, based on the determined memory status and a target memory status value of a virtual machine associated with the guest operating system, the amount of guest physical addresses.

6. The computer readable storage medium of claim 1, wherein the instructions for adjusting, based on the determined memory status, the amount of guest physical addresses determined by the memory manager further comprise:
instructions for adjusting, based on the determined memory status and a minimum memory status value of a virtual machine associated with the guest operating system, the amount of guest physical addresses.

7. The computer readable storage medium of claim 1, wherein the instructions for adjusting, based on the determined memory status, the amount of guest physical addresses determined by the memory manager further comprise:
instructions for de-committing memory from a second guest operating system; and
instructions for committing the de-committed memory to the guest operating system.

8. The computer readable storage medium of claim 1, further comprising:
instructions for receiving guest operating system paging information from the memory manager; and
instructions for determining the memory status from at least the guest operating system paging information.

9. The computer readable storage medium of claim 1, further comprising:
instructions for setting a polling rate for determining the memory status; and
instructions for adjusting the polling rate based on changes to the memory status detected over time.

10. A method comprising:
calculating memory status of a guest operating system of a virtual machine from at least physical memory notifications and guest operating system paging information, the physical memory notifications and guest operating system paging information being determined and provided from a service client, the virtual machine comprising the service client, the guest operating system executing the client service to determine and provide the memory notifications from within the guest operating system and to determine and provide the guest operating system paging information from within the guest operating system; and
adjusting, during runtime operation of the guest operating system, an amount of memory available to the guest operating system based on at least the calculated memory status of the guest operating system.

11. The method of claim 10, wherein adjusting the amount of memory available to the guest operating system further comprises:
adjusting memory from the guest operating system based on a determination that current memory status of the guest operating system is different than a target threshold.

12. The method of claim 10, wherein adjusting the amount of memory available to the guest operating system further comprises:
committing memory to the guest operating system based on a determination that current memory status of the guest operating system is greater than a minimum threshold.

13. The method of claim 10, wherein adjusting the amount of memory available to the guest operating system further comprises:
de-committing memory from a second guest operating system based on a determination that current memory status of the guest operating system is lower than a target threshold; and
committing the de-committed memory to the guest operating system.

14. The method of claim 10, further comprising:
de-committing memory from the guest operating system; and
committing the de-committed memory to a host operating system.

15. A computer system comprising:
a memory having stored thereon instructions that, upon execution, cause the system to at least:
effectuate a guest operating system within a child partition;
generate a polling rate for obtaining a memory status of the guest operating system;
obtain the memory status of the guest operating system based on the polling rate by receiving notifications from a memory manager of the guest operating system, the notifications being triggered from within the guest operating system, the notifications being triggered based on a comparison of an amount of guest physical addresses associated with the guest operating system and a predefined amount of guest physical addresses associated with the guest operating system; and
adjust the amount of guest physical addresses based on the obtained memory status of the guest operating system.

16. The computer system of claim 15, wherein the memory has stored thereon further instructions that, upon execution, cause the system to at least:
commit an amount of memory to the guest operating system based on a determination that the memory status associated with the guest operating system is greater than a target threshold.

17. The computer system of claim 15, wherein the memory has stored thereon further instructions that, upon execution, cause the system to at least:
commit an amount of memory to the guest operating system based on a determination that the memory status associated with the guest operating system is greater than a minimum threshold.

18. The computer system of claim 15, wherein the memory has stored thereon further instructions that, upon execution, cause the system to at least:
de-commit memory committed to a second guest operating system based on a determination that current memory status of the guest operating system is greater than a target threshold; and
commit the de-committed memory to the guest operating system.

19. The computer system of claim 15, wherein the memory has stored thereon further instructions that, upon execution, cause the system to at least:
de-commit memory from the guest operating system; and
commit the de-committed memory to a host operating system.

* * * * *